Figure 1:
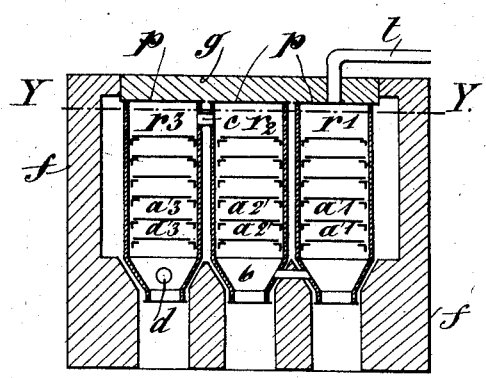

No. 736,876. PATENTED AUG. 18, 1903.
E. RAYNAUD & L. PIERRON.
PROCESS OF MAKING SULFURIC ANHYDRID.
APPLICATION FILED APR. 8, 1902.
NO MODEL.

INVENTORS
Emile Raynaud
Leon Pierron,
BY
Richards
ATTORNEYS.

WITNESSES:

No. 736,876.

Patented August 18, 1903.

UNITED STATES PATENT OFFICE.

EMILE RAYNAUD, OF SPY, AND LÉON PIERRON, OF JETTE-ST.-PIERRE, BELGIUM.

PROCESS OF MAKING SULFURIC ANHYDRID.

SPECIFICATION forming part of Letters Patent No. 736,876, dated August 18, 1903.

Original application filed September 14, 1900, Serial No. 30,023. Divided and this application filed April 8, 1902. Serial No. 101,969. (No specimens.)

*To all whom it may concern:*

Be it known that we, EMILE RAYNAUD, a subject of the King of the Belgians, residing at Spy, and LÉON PIERRON, a citizen of the French Republic, residing at Jette-St.-Pierre, Belgium, have invented a certain new and useful Improvement in Processes of Making Sulfuric Anhydrid, of which the following is a specification.

This application is a division of application Serial No. 30,023, filed by us September 14, 1900.

This invention relates to the manufacture of sulfuric acid without the use of leaden chambers by the means known as the "catalytic method"—that is, by means of substances or bodies acting as vehicles of contact; and the said invention has for its object to provide means for obtaining results in the manufacture of sulfuric acid on a commercial scale as nearly as possible equal to theoretical results. The basis on which we work to attain this object is the observation that for a given gaseous mixture composed of given proportions of $SO_2$ and $O$ with a uniform temperature there is for vehicles of contact a certain degree of richness in platinum or other catalytic agent which is the most favorable for the combination. This observation has led us to devise a method or process giving the following results: first, we avoid overheating at the commencement of the operation; second, we obtain toward the end of the operation recombination of the elements which are dissociated in the course of the operation.

Our said process consists, essentially, in promoting at first the combination of a portion of the sulfurous acid with a portion of the oxygen and then the combination of the remainder of these two gases, and lastly the recombination of such portions of the said gases as are liberated by decomposition of the acid formed. For this purpose the temperature at which the operation is carried on being kept uniform catalytic bodies or substances containing but a small proportion of platinum are placed near the inlet for the gaseous mixture and then substances containing less platinum. The consequence is that a portion of the gaseous mixture while rich is first converted by the substances of slight richness, and as it becomes impoverished it is subjected to the action of substances of greater richness, which complete the conversion. If the reaction has been excessive and decomposition of the sulfuric acid has consequently taken place, the reformation subsequently takes place on contact with the poorer substances. According to a well-known method the sulfuric acid formed may also be collected at the outlet of the second vessel or of the first and second vessels, in which case the gases to be introduced into the next vessel must of course be reheated at the required temperature.

Figure 2:
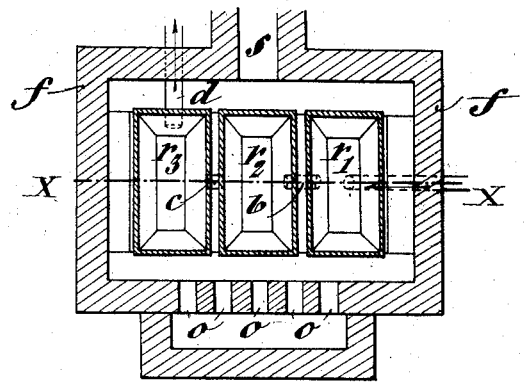

Figure 1 of the accompanying drawings represents in vertical section through the line $x\ x$, Fig. 2, and Fig. 2 in horizontal section, apparatus suitable for carrying our invention into practice.

The apparatus contains three vessels $r'\ r^2\ r^3$, provided with covers $p\ p$, inclosed within brick walls $f\ f$. A layer of insulating material $g$ is placed over the covers of the said vessels to prevent undue cooling. Around the said vessels circulate hot gases proceeding from a gas-producer or an ordinary furnace and entering through passages $o\ o$, provided with dampers, one or more of which may be closed to regulate the temperature in the vessels. The hot gases escape through a passage $s$. Inside the vessels are arranged superposed sieves $a'\ a^2\ a^3$, respectively, upon which are placed the catalytic substances. The gaseous mixture of sulfurous acid and oxygen or air, which may have been previously purified, is caused to enter the first vessel $r'$ through a pipe $t$, fitted to an opening in the cover $p$ of the said vessel. The said gaseous mixture passes down through the catalytic substances resting on the sieves $a'$, then through a pipe $b$ to the lower part of the second vessel $r^2$, up through the catalytic substances resting on the sieves $a^2$, then through a pipe $c$ to the upper part of the third vessel $r^3$, and down again through the catalytic substances resting on the sieves $a^3$, to finally escape from the lower part of the said third vessel $r^3$ through a pipe $d$ to the condensing apparatus. In the first vessel $r'$ are placed catalytic substances containing, say, up to five per cent. of platinum, in the second vessel $r^2$ substances containing, say, about forty per cent. of platinum, and in the third vessel $r^3$ substances containing, say, ten per cent. of platinum near the gas-inlet, the percentage of platinum decreasing as the substances are placed nearer to the outlet.

A portion of the gaseous mixture while rich is converted into sulfuric acid by the substances of slight richness contained in the first vessel $r'$. As it becomes impoverished it is subjected to the action of substances of greater richness, which complete the conversion in the second vessel $r^2$, and if the reaction has been excessive and partial decomposition of the sulfuric acid formed has taken place in the said second vessel the reformation takes place on contact with the poorer substances contained in the third vessel $r^3$.

The course of the operation can easily be followed by analyzing gases collected at the outlet of each of the vessels.

Instead of using porous bodies containing platinum in all the vessels other known vehicles of contact may be used—such as bodies containing oxids of copper, iron, or chrome—and these may be either of a uniform nature in all the vessels and of increasing and afterward decreasing richness or of a different kind in each vessel, or bodies may be used in which the same contact substance is distributed in equal proportions, but on supports of a different nature—such as platinized pumice-stone, platinized asbestos, platinized burnt clay—or the bodies used may differ in no other respect but the manner in which they have been prepared, such as platinized asbestos prepared by charging the asbestos with chlorid of platinum and burning or prepared by reducing chlorid of platinum by means of formiate of soda.

It will be understood that the disposition of the catalytic substances as described obviates the overheating which takes place near the gas-inlet when the gas comes immediately into contact with substances rich in platinum.

Having fully described our invention, what we claim, and desire to secure by Letters Patent, is—

1. The process for the manufacture of sulfuric anhydrid which consists in passing a gas containing sulfurous acid and oxygen through vessels heated at a uniform temperature and containing contact substances arranged so that the gas may first come in contact with substances having but a slight catalytic action, then with substances having a more powerful catalytic action and lastly with substances having a less powerful catalytic action.

2. The process for the manufacture of sulfuric anhydrid which consists in passing a gas containing sulfurous acid and oxygen through vessels heated at a uniform temperature and containing contact substances arranged so that the gas may first come in contact with substances having a slight increasing catalytic action, then with substances having a more powerful catalytic action and lastly with substances having a less and decreasing catalytic action.

3. The process for the manufacture of sulfuric anhydrid which consists in passing a gas containing sulfurous acid and oxygen through a vessel containing contact substances of slight richness in platinum for promoting partial combination of the sulfurous acid and oxygen, then through a second vessel containing contact substances richer in platinum for completing the said combination without preventing partial dissociation of the anhydrid formed and lastly through a third vessel containing contact substances poorer in platinum for causing recombination of the gases that may have become dissociated in the second vessel.

In witness whereof we have hereunto set our hands in presence of two witnesses.

EMILE RAYNAUD.
    LÉON PIERRON.

Witnesses:
 H. T. E. KIRKPATRICK,
 GREGORY PHELAN.